US012614269B2

(12) United States Patent
Wang et al.

(10) Patent No.: US 12,614,269 B2
(45) Date of Patent: Apr. 28, 2026

(54) LIGHTNING SHIELDING FAILURE RISK ASSESSMENT METHOD FOR A POWER TRANSMISSION LINE BASED ON THREE-DIMENSIONAL LASER POINT CLOUD DATA

(71) Applicant: STATE GRID HUBEI ELECTRIC POWER RESEARCH INSTITUTE, Wuhan (CN)

(72) Inventors: Xiankang Wang, Wuhan (CN); Xueming Zhou, Wuhan (CN); Yao Yao, Wuhan (CN); Zijian Li, Wuhan (CN); Zhiqiang Feng, Wuhan (CN); Xiaopeng Liu, Wuhan (CN); Jianjin Fu, Wuhan (CN); Junjie Huang, Wuhan (CN); Zhi Zhang, Wuhan (CN)

(73) Assignee: STATE GRID HUBEI ELECTRIC POWER RESEARCH INSTITUTE, Wuhan (CN)

( * ) Notice: Subject to any disclaimer, the term of this patent is extended or adjusted under 35 U.S.C. 154(b) by 9 days.

(21) Appl. No.: 19/014,599

(22) Filed: Jan. 9, 2025

(65) Prior Publication Data

US 2025/0245801 A1 Jul. 31, 2025

(30) Foreign Application Priority Data

Jan. 30, 2024 (CN) .......................... 202410127422.9

(51) Int. Cl.
| | |
|---|---|
| *G06T 7/00* | (2017.01) |
| *G06T 19/20* | (2011.01) |
| *G06V 10/764* | (2022.01) |

(52) U.S. Cl.
CPC ............ *G06T 7/0002* (2013.01); *G06T 19/20* (2013.01); *G06V 10/764* (2022.01); *G06T 2207/10028* (2013.01); *G06T 2219/2012* (2013.01)

(58) Field of Classification Search
CPC ............ G06T 2207/10028; G06T 7/73; G06T 7/0004; B64U 10/13; G01S 17/42;
(Continued)

(56) References Cited

U.S. PATENT DOCUMENTS

| 2019/0295423 A1* | 9/2019 | Dow | ......................... G08G 5/55 |
| 2021/0073692 A1* | 3/2021 | Saha | ............... G06Q 10/06316 |

(Continued)

FOREIGN PATENT DOCUMENTS

| CN | 111864898 A | 10/2020 |
| CN | 112541211 A | 3/2021 |

(Continued)

OTHER PUBLICATIONS

Chinese Office Action for Application No. 202410127422.9 dated Feb. 11, 2025.
Notification to Grant Patent Right for Invention for Application No. 202410127422.9 dated Mar. 5, 2025.

*Primary Examiner* — Xilin Guo
(74) *Attorney, Agent, or Firm* — MOSER TABOADA

(57) ABSTRACT

A lightning shielding failure risk assessment method for a power transmission line based on three-dimensional laser point cloud data includes reclassifying three-dimensional laser point cloud data of a power transmission corridor; acquiring lightning activity parameters for the power transmission corridor; determining wire, ground wire, and ground point cloud striking distances; plotting three-dimensional wire, ground wire, and ground shielding arc surfaces in the preprocessed three-dimensional laser point coordinate system; performing orthogonal projection of the plotted three-
(Continued)

dimensional shielding arc surfaces to obtain two-dimensional exposed arc surfaces and determining the areas of the two-dimensional exposed arc surfaces; and looping to calculate the areas of the exposed arc surfaces at different lightning incidence angles and different lightning current amplitudes; and determining a line trip rate based on the lightning strike density, the lightning incidence angle probability distribution function, and the lightning current probability distribution function.

14 Claims, 5 Drawing Sheets

(58) Field of Classification Search
CPC ...... G01S 17/86; G06V 20/176; G06V 20/52; G06V 20/64
See application file for complete search history.

(56) References Cited

U.S. PATENT DOCUMENTS

| | | | | |
|---|---|---|---|---|
| 2022/0139094 A1* | 5/2022 | Yoshimi | ................. | G06T 7/174 |
| | | | | 382/173 |
| 2024/0393107 A1* | 11/2024 | Kise | ...................... | H04N 23/74 |

FOREIGN PATENT DOCUMENTS

| | | | |
|---|---|---|---|
| CN | 113267667 A | 8/2021 |
| CN | 115953545 A | 4/2023 |
| CN | 116520043 A | 8/2023 |
| JP | 2023141646 A | 10/2023 |
| WO | WO 2022/127616 A1 | 6/2022 |
| WO | WO 2022/142628 A1 | 7/2022 |

* cited by examiner

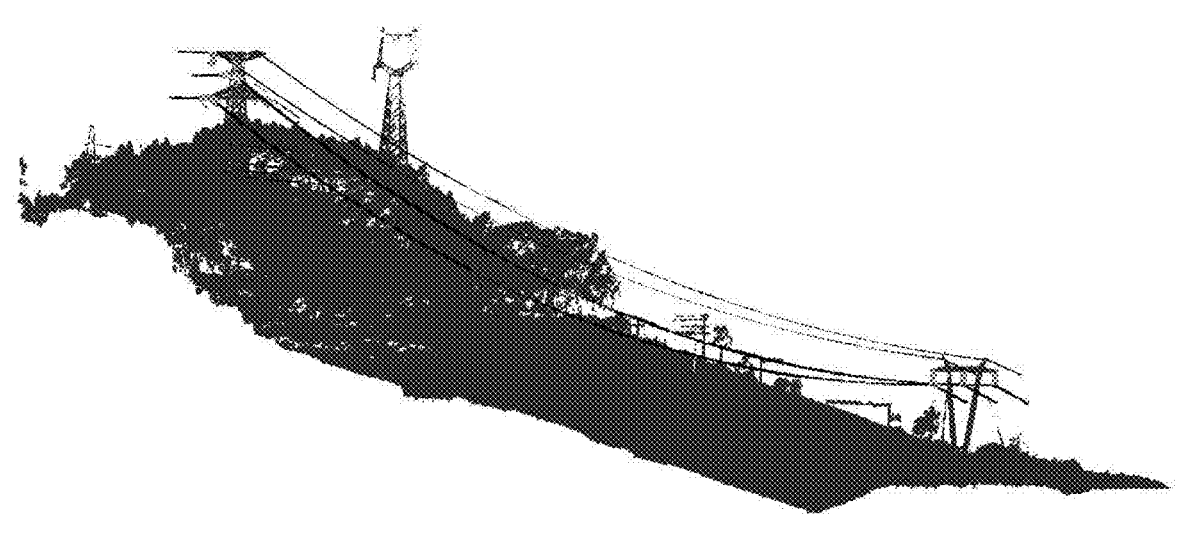
FIG. 1
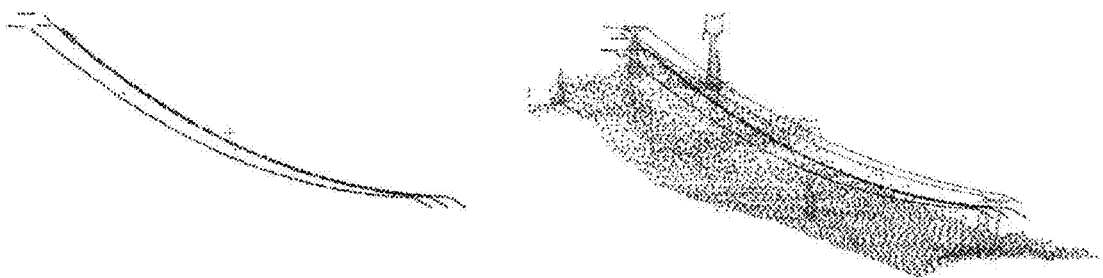
FIG. 2A Ground wire point cloud          FIG. 2B Ground point cloud
FIG. 2C Wire point cloud          FIG. 2D Combined point cloud

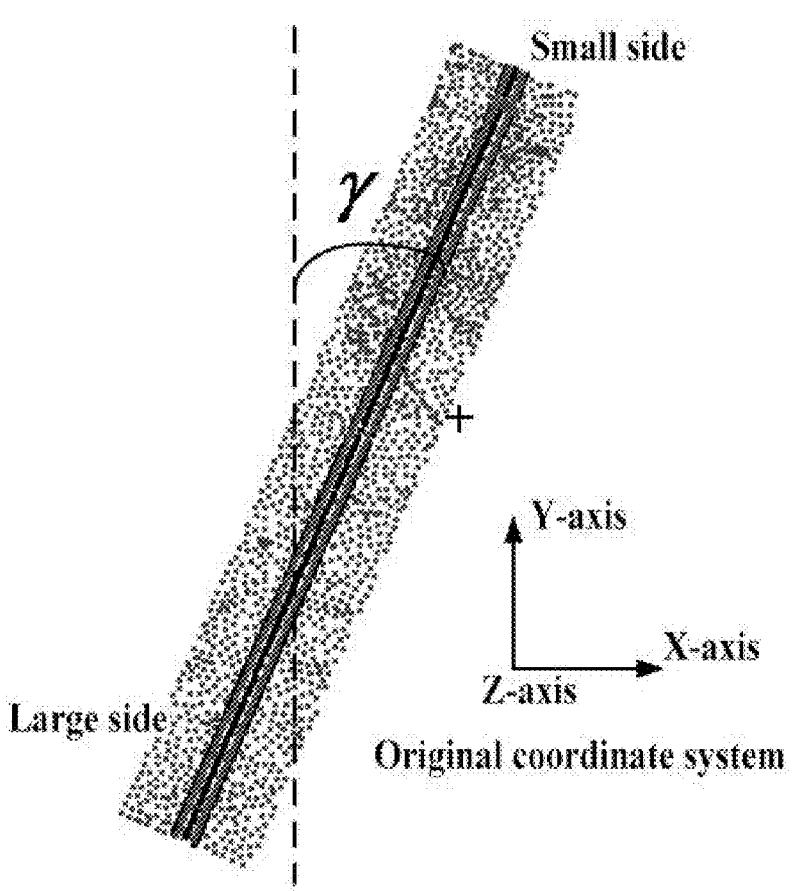
FIG. 3A  Original point cloud coordinate system
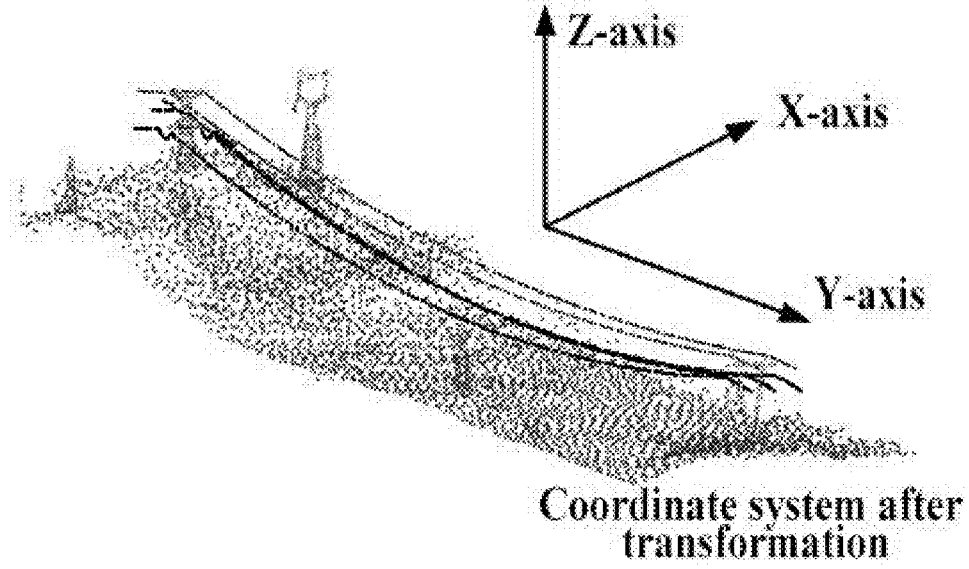
FIG. 3B  Point cloud coordinate system after transformation

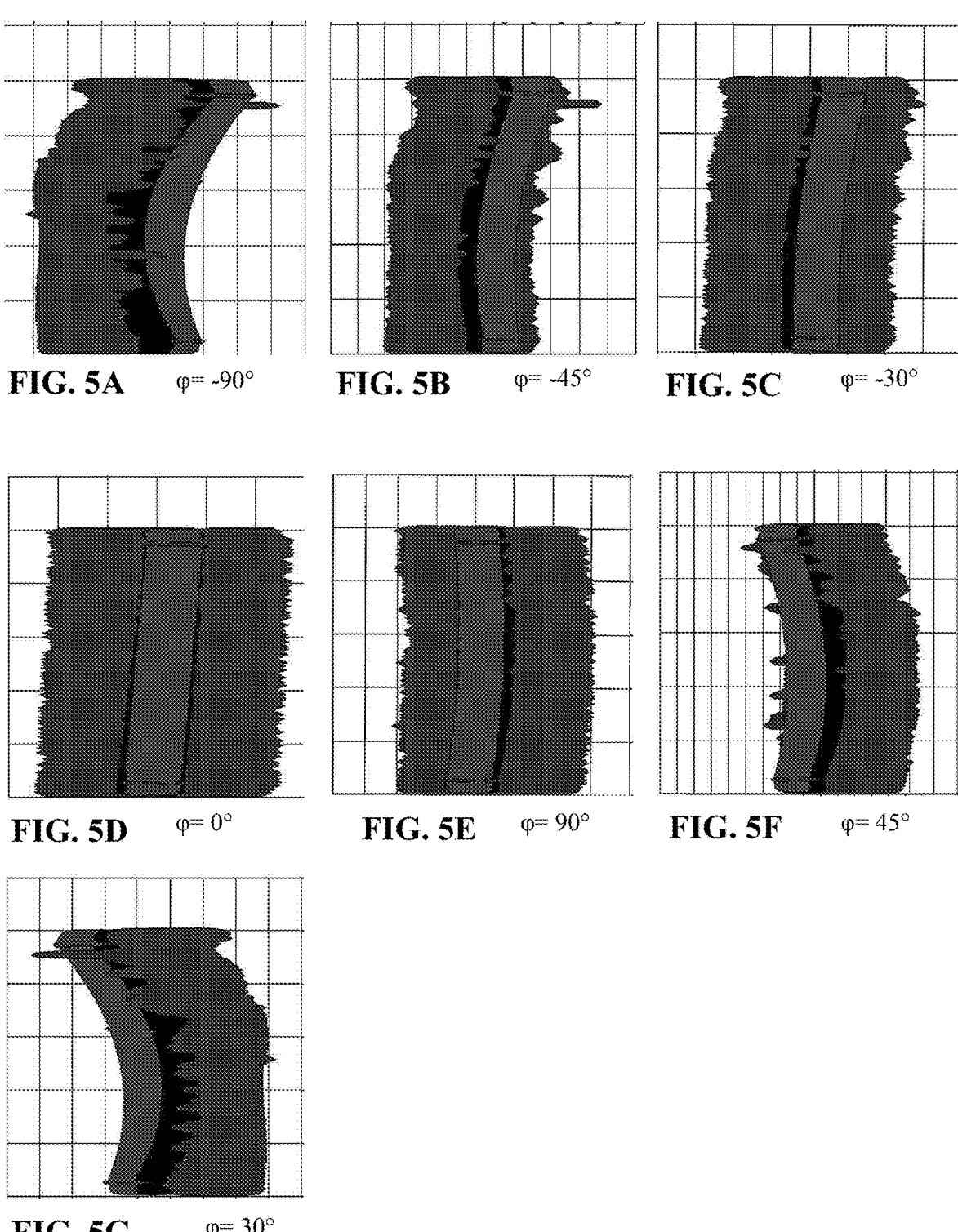
FIG. 5A　　φ= -90°　　　FIG. 5B　　φ= -45°　　　FIG. 5C　　φ= -30°
FIG. 5D　　φ= 0°　　　FIG. 5E　　φ= 90°　　　FIG. 5F　　φ= 45°
FIG. 5G　　φ= 30°

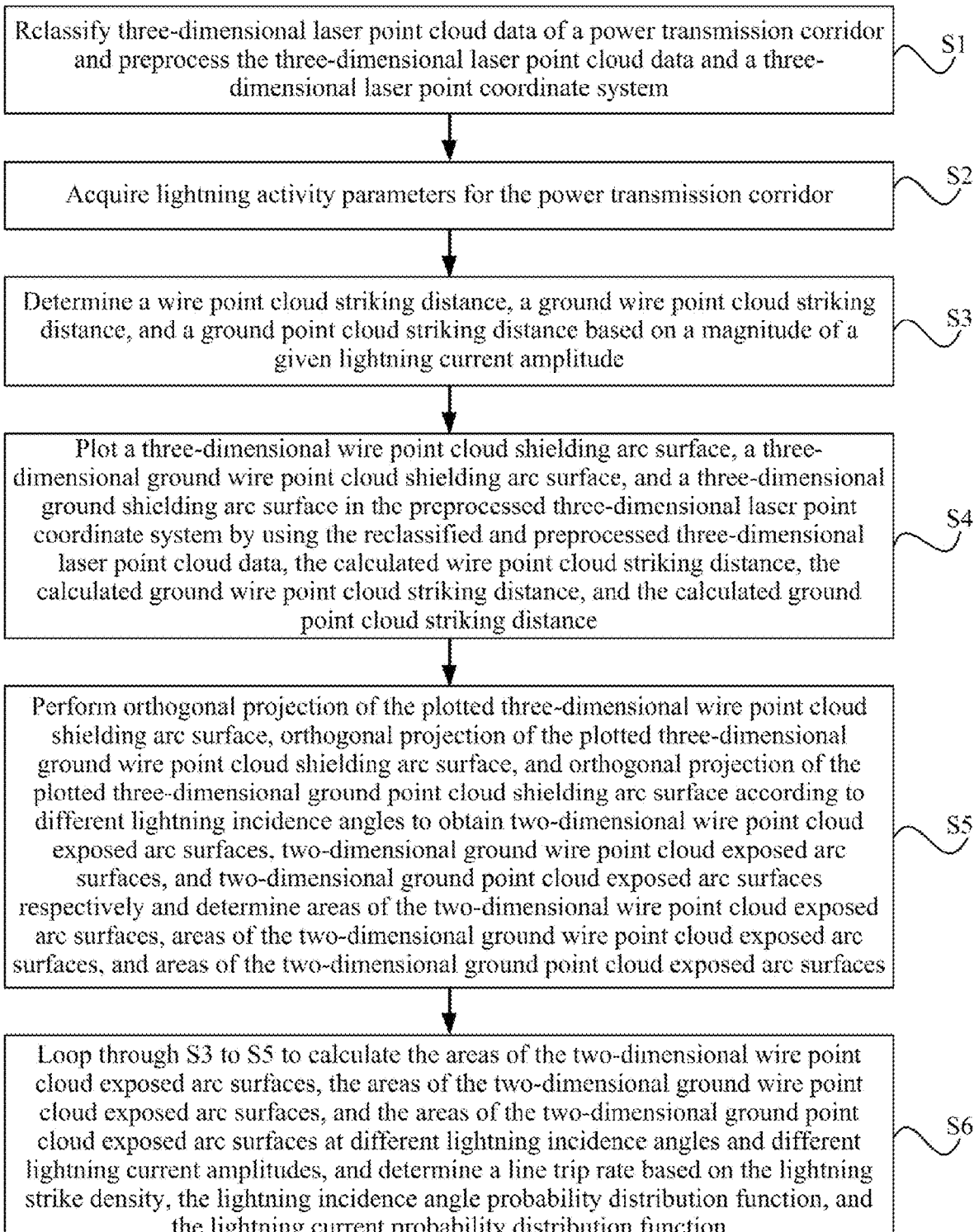

Reclassify three-dimensional laser point cloud data of a power transmission corridor and preprocess the three-dimensional laser point cloud data and a three-dimensional laser point coordinate system      S1

Acquire lightning activity parameters for the power transmission corridor      S2

Determine a wire point cloud striking distance, a ground wire point cloud striking distance, and a ground point cloud striking distance based on a magnitude of a given lightning current amplitude      S3

Plot a three-dimensional wire point cloud shielding arc surface, a three-dimensional ground wire point cloud shielding arc surface, and a three-dimensional ground shielding arc surface in the preprocessed three-dimensional laser point coordinate system by using the reclassified and preprocessed three-dimensional laser point cloud data, the calculated wire point cloud striking distance, the calculated ground wire point cloud striking distance, and the calculated ground point cloud striking distance      S4

Perform orthogonal projection of the plotted three-dimensional wire point cloud shielding arc surface, orthogonal projection of the plotted three-dimensional ground wire point cloud shielding arc surface, and orthogonal projection of the plotted three-dimensional ground point cloud shielding arc surface according to different lightning incidence angles to obtain two-dimensional wire point cloud exposed arc surfaces, two-dimensional ground wire point cloud exposed arc surfaces, and two-dimensional ground point cloud exposed arc surfaces respectively and determine areas of the two-dimensional wire point cloud exposed arc surfaces, areas of the two-dimensional ground wire point cloud exposed arc surfaces, and areas of the two-dimensional ground point cloud exposed arc surfaces      S5

Loop through S3 to S5 to calculate the areas of the two-dimensional wire point cloud exposed arc surfaces, the areas of the two-dimensional ground wire point cloud exposed arc surfaces, and the areas of the two-dimensional ground point cloud exposed arc surfaces at different lightning incidence angles and different lightning current amplitudes, and determine a line trip rate based on the lightning strike density, the lightning incidence angle probability distribution function, and the lightning current probability distribution function      S6

LIGHTNING SHIELDING FAILURE RISK ASSESSMENT METHOD FOR A POWER TRANSMISSION LINE BASED ON THREE-DIMENSIONAL LASER POINT CLOUD DATA

CROSS-REFERENCE TO RELATED APPLICATION

This application claims priority to Chinese patent application No. 202410127422.9 filed with the China National Intellectual Property Administration (CNIPA) on Jan. 30, 2024, the disclosure of which is incorporated herein by reference in its entirety.

TECHNICAL FIELD

The present disclosure belongs to the technical field of lightning shielding failure risk assessment for power transmission lines, for example, a lightning shielding failure risk assessment method for a power transmission line based on three-dimensional laser point cloud data.

BACKGROUND

Practical operation and maintenance experience indicates that lightning strikes are one of the primary causes of overhead transmission lines tripping. Lightning strikes primarily occur in two forms: shielding failure and back flashover. For transmission lines with voltage levels of 220 kV and above, due to the relatively large dry arc distance of insulators and the high lightning withstand level for back flashover, the probability of line tripping caused by back flashover is low. As a result, shielding failure have become the main risk source for lightning tripping accidents. Statistics about the operation of a 500 kV transmission line show that over 90% of lightning tripping accidents are caused by shielding failure. Conducting lightning shielding failure risk assessment for overhead transmission lines helps identify weak points in line lightning protection and guide the implementation of differentiated lightning protection modifications, thereby being of significant importance for better improving the lightning protection technology of power grids.

Electro Geometric Model (EGM) takes into account factors such as the terrain of the area where a transmission line is located, the relative position of a ground wire, and a lightning current amplitude probability distribution. Electro Geometric Model enables quantitative calculation of shielding failure risks and is widely used in lightning shielding failure risk assessment for power transmission lines of all voltage levels. The basic principle of EGM is to plot lightning attraction arcs for different objects based on ground parameters and the attachment point location of the ground wire. By determining the geometric relationships such as intersection, tangency, and inclusion of these arcs, the model assesses whether lightning will strike the wire. Currently, key parameters such as ground slope and the coordinates of the ground wire attachment point are mainly obtained through manual reference to line design drawings or on-site measurements, which is labor-intensive and often results in low data accuracy. With the introduction of Digital Elevation Model (DEM) data, it has become possible to conduct a more refined lightning shielding failure risk assessment by using micro-terrain parameters. Some scholars have proposed segmenting the single span distance into slices, performing lightning shielding failure risk assessment for each slice based on terrain parameters extracted from the DEM data slices, and determining the shielding failure trip rate for the entire span distance by weighted averaging. However, the actual variable terrain along the transmission line makes the variation of ground inclination along the line very complex, and the accuracy of DEM data is limited, resulting in poor representativeness of terrain parameters extracted from the two-dimensional DEM slices. In addition, the attachment point location of the ground wire in the span distance is usually not directly available from the drawings and needs to be estimated based on the sag or measured on site. The insufficient accuracy of terrain parameters and attachment point parameters of the ground wire limits the practical engineering effectiveness of detailed risk assessment.

Three-dimensional laser scanning technology emerged in the 1990s and uses high-speed laser scanning measurement methods to quickly obtain three-dimensional coordinate data of the surface of the measured object over large areas with high resolution. Currently, airborne three-dimensional laser scanning technology has been widely applied to 220 kV and above transmission lines, obtaining a large amount of three-dimensional point cloud data for transmission corridors, thereby laying a data foundation for detailed lightning protection assessment based on three-dimensional laser point clouds. Some scholars, mimicking the processing method of digital elevation models, perform slicing operations on the three-dimensional laser point clouds, enabling the high-precision extraction of parameters such as the attachment points of ground wires and ground inclination within the slices, thereby achieving finer-grained lightning shielding failure risk assessment. However, this "slice-parameter extract" approach has high computational complexity and is difficult to handle more complex situations such as multi-circuit towers, dense corridors, and crossing spans. Therefore, the application scope of this approach is limited to simpler conditions such as single spans and single circuits.

The traditional lightning multi-circuit towers risk assessment method based on digital elevation models or three-dimensional laser point clouds centers on slicing a three-dimensional scene into two dimensions, extracting ground wire and terrain parameters from the 2D slices according to various graphic processing algorithms, and using a 2D EGM to calculate the lightning shielding arcs. On the one hand, the method of extracting terrain parameters using 2D slices struggles to handle complex terrains, especially in areas where the terrain changes sharply along the line path, such as valleys, mountain tops, and slopes. On the other hand, with the increasing prevalence of multi-circuit towers and dense corridors, the number of ground wire attachment points in the 2D slices significantly increases, making it very complex to use the traditional 2D EGM to plot shielding arcs and determine the geometric relationships of the shielding arcs. Additionally, this approach cannot account for the impact of crossing spans, nearby lines, and other factors on the lightning shielding characteristics of the to-be-assessed line. Therefore, the application scope of the traditional lightning shielding failure risk assessment approach is still limited to simpler conditions such as single spans and single circuits.

SUMMARY

The present disclosure aims to address the shortcomings of the related art and thus provides a lightning shielding failure risk assessment method for a power transmission line based on three-dimensional laser point cloud data is provided. Without complex two-dimensional slicing, parameter extraction, and geometric relationship determination of shielding arcs, the method enables rapid determination of the area of the three-dimensional exposed arc surfaces of the power transmission line and accurate assessment of the line shielding failure trip rate.

A lightning shielding failure risk assessment method for a power transmission line based on three-dimensional laser point cloud data includes S1: reclassifying three-dimensional laser point cloud data of a power transmission corridor and preprocessing the three-dimensional laser point cloud data and a three-dimensional laser point coordinate system; S2: acquiring lightning activity parameters for the power transmission corridor, where the lightning activity parameters include a lightning strike density, a lightning current probability distribution function, and a lightning incidence angle probability distribution function; S3: determining a wire point cloud striking distance, a ground wire point cloud striking distance, and a ground point cloud striking distance based on a magnitude of a given lightning current amplitude; S4: plotting a three-dimensional wire point cloud shielding arc surface, a three-dimensional ground wire point cloud shielding arc surface, and a three-dimensional ground point cloud shielding arc surface in the preprocessed three-dimensional laser point coordinate system by using the reclassified and preprocessed three-dimensional laser point cloud data, the calculated wire point cloud striking distance, the calculated ground wire point cloud striking distance, and the calculated ground point cloud striking distance; S5: performing orthogonal projection of the plotted three-dimensional wire point cloud shielding arc surface, orthogonal projection of the plotted three-dimensional ground wire point cloud shielding arc surface, and orthogonal projection of the plotted three-dimensional ground point cloud shielding arc surface according to different lightning incidence angles to obtain two-dimensional wire point cloud exposed arc surfaces, two-dimensional ground wire point cloud exposed arc surfaces, and two-dimensional ground point cloud exposed arc surfaces respectively and determining the areas of the two-dimensional wire point cloud exposed arc surfaces, the areas of the two-dimensional ground wire point cloud exposed arc surfaces, and the areas of the two-dimensional ground point cloud exposed arc surfaces; and S6: looping through S3 to S5 to calculate the areas of the two-dimensional wire point cloud exposed arc surfaces, the areas of the two-dimensional ground wire point cloud exposed arc surfaces, and the areas of the two-dimensional ground point cloud exposed arc surfaces at different lightning incidence angles and different lightning current amplitudes; and determining a line trip rate in conjunction with the lightning strike density, the lightning incidence angle probability distribution function, and the lightning current probability distribution function.

S1 includes S1.1: reclassifying and coloring the three-dimensional laser point cloud data; S1.2: preprocessing the reclassified and colored three-dimensional laser point cloud data: S1.2.1: point cloud resampling: resampling original point cloud data such that a geometric distance between resampled points does not exceed a given value d, where d is much smaller than a striking distance; S1.2.2: outlier removal: removing outliers from point cloud samples by using a statistical outlier removal (SOR) filter; and S1.3: adjusting a resampled point cloud coordinate system: plotting a connecting line that connects a center of a large-side tower and a center of a small-side tower, acquiring an angle $\gamma$ between the connecting line and a Y-axis of an original coordinate system, and rotating the original point cloud data around a Z-axis of the original coordinate system by the angle $\gamma$, that is, multiplying coordinates of the original point cloud data by a coordinate transformation matrix $T_z(\gamma)$:

$$T_z(\gamma) = \begin{bmatrix} \cos(\gamma) & \sin(\gamma) & 0 \\ \sin(\gamma) & \cos(\gamma) & 0 \\ 0 & 0 & 1 \end{bmatrix}.$$

Reclassifying the three-dimensional laser point cloud data of the power transmission corridor in S1.1 includes reclassifying the laser point cloud data of the power transmission corridor into wire point cloud data, ground wire point cloud data, and ground point cloud data associated with lightning protection determination and coloring the wire point cloud data, the ground wire point cloud data, and the ground point cloud data. The wire point cloud data includes original wire point cloud data. The ground wire point cloud data includes original ground wire point cloud data, crossing wire point cloud data, other wire point cloud data, and shared wire point cloud data. The remaining original point cloud data is classified as the ground point cloud data.

Removing the outliers from the point cloud samples in S1.2.2 includes traversing all neighboring points of each point in the point cloud data and determining distances dij from each point in the point cloud data to the neighboring points, where i=1, 2, . . . , m, j=1, 2, . . . , k, m denotes the total number of points in the point cloud data, k denotes the number of neighboring points, and k ranges from 6 to 10; and determining neighborhood distance statistical parameters for a point cloud set:

$$\mu = \frac{1}{mk} \sum_{i=1}^{m} \sum_{j=1}^{k} d_{ij} \text{ and } \sigma = \sqrt{\frac{1}{mk} \sum_{i=1}^{m} \sum_{j=1}^{k} (d_{ij} - \mu)^2}.$$

$\mu$ denotes the mean value of neighborhood distances for the point cloud set, and $\sigma$ denotes the standard deviation of the neighborhood distances for the point cloud set. For point i, in response to distances from the point i to neighboring points of the point i satisfying the following formula, considering the point i as an outlier and removing the point i:

$$\frac{1}{k} \sum_{j=1}^{k} d_{ij} > \mu + 3\sigma.$$

S2 includes S2.1: querying lightning positioning system data and selecting the total number of lightning strikes in the power transmission corridor within one year and a lightning current amplitude for each lightning strike; S2.2: determining the lightning strike density Ng based on the area of the power transmission corridor and the total number of lightning strikes, where the lightning strike density is in units of km$^2$; S2.3: statistically determining the lightning current amplitude for each selected lightning strike by using a log-normal distribution based on the following formulas:

$$f(I) = \frac{1}{\sqrt{2\pi}\beta I} e^{-z^2/2} \text{ and } z = \frac{\ln I - \text{mean}(\ln I)}{\beta},$$

where f(I) denotes a lightning current probability distribution function, lnI denotes a natural logarithm of the lightning current amplitude I, mean(lnI) denotes the mean value of natural logarithms of lightning current amplitudes, and $\beta$ denotes the standard deviation of the natural logarithms of the lightning current amplitudes; and S2.4: defining the lightning incidence angle probability density function as the following formula: $g(\phi)=0.75\times\cos^3(\phi)$, $-\pi/2<\phi<\pi/2$ where $\phi$ denotes the angle between a lightning leader and a vertical direction.

In S3, the wire point cloud striking distance $r_c$ and the ground wire point cloud striking distance $r_{gw}$ satisfy $r_c=r_{gw}=0.67\times h^{0.6}\times I^{0.74}$.

Here h denotes the height (that is, a Z-coordinate) of wire point cloud data or ground wire point cloud data, and I denotes the lightning current amplitude.

In S3, the ground point cloud striking distance $r_g$ satisfies $r=0.9\times I^{0.65}$.

In S4, for any point cloud point $p_i(x_i, y_i, z_i)$, a three-dimensional shielding arc surface of the point cloud point is a spherical surface, and an equation for the spherical surface is $(x-x_i)^2+(y-y_i)^2+(z-z_i)^2=r^2$. Here r denotes a striking distance corresponding to a point cloud of the same type as the point cloud point; and three-dimensional shielding arc surfaces of different types of objects are obtained after unions of spherical surfaces plotted for different types of point clouds are calculated.

S5 includes S5.1: rotating a plotted three-dimensional shielding arc surface counterclockwise by an angle $\phi$ along the Y-axis, that is, multiplying each point on the three-dimensional shielding arc surface by the following coordinate transformation matrix $T_y(\phi)$:

$$T_y(\varphi) = \begin{bmatrix} 1 & 0 & 0 \\ 0 & \cos(\varphi) & -\sin(\varphi) \\ 0 & \sin(\varphi) & \cos(\varphi) \end{bmatrix};$$

S5.2: performing orthogonal projection along the Z-axis direction on the three-dimensional shielding arc surface rotated counterclockwise by the angle $\phi$ along the Y-axis to obtain a two-dimensional shielding arc surface, where the scale factor of the orthogonal projection is M, that is, the actual area corresponding to each pixel of a projected two-dimensional image, where the actual area is in units of $km^2$/pixel; and S5.3: determining the areas of the two-dimensional shielding arc surface at different angles: counting the number of exposed wire arc surfaces and multiplying the number of exposed wire arc surfaces by the projection scale factor M to obtain the area of the exposed wire arc surfaces at different lightning incidence angles by the following formula, where the areas of the exposed wire arc surfaces at different lightning incidence angles is in units of $km^2$: $S_c(I, \phi)=count(p.color=red)\times M$ S6 includes looping to calculate the areas of two-dimensional exposed arc surfaces at different lightning incidence angles and different lightning current amplitudes and determining the line shielding failure trip rate $R_{SFFOR}$ based on the lightning incidence angle probability distribution function and the lightning current probability distribution function by the following formula:

$$R_{SFFOR} = 2N_g \int_{-\pi/2}^{\pi/2}\int_{I_c}^{Imax} S_c(I, \phi)f(I)g(\phi)dId\phi.$$

Here Ic denotes the minimum lightning current amplitude able to cause line tripping at a given lightning incidence angle $\phi$, and Imax denotes the maximum lightning current amplitude able to cause line tripping at the given lightning incidence angle $\phi$. Here the minimum lightning current amplitude and the maximum lightning current amplitude are in units of kA, and Imax is the minimum lightning current amplitude that enables $Sc(I, \phi)=0$.

BRIEF DESCRIPTION OF DRAWINGS

FIG. 1 illustrates a laser point cloud after reclassification.

FIG. 2A illustrates a ground wire point cloud after resampling and outlier removal.

FIG. 2B illustrates a ground point cloud after resampling and outlier removal.

FIG. 2C illustrates a wire point cloud after resampling and outlier removal.

FIG. 2D illustrates a combined point cloud composed of a ground wire point cloud, a ground point cloud, and a wire point cloud after resampling and outlier removal.

FIG. 3A illustrates the original point cloud coordinate system.

FIG. 3B illustrates a point cloud coordinate system after coordinate transformation.

FIG. 5A illustrates a 2D shielding arc surface at an angle of $\phi=-90°$.

FIG. 5B illustrates a 2D shielding arc surface at an angle of $\phi=-45°$.

FIG. 5C illustrates a 2D shielding arc surface at an angle of $\phi=-30°$.

FIG. 5D illustrates a 2D shielding arc surface at an angle of $\phi=0°$.

FIG. 5E illustrates a 2D shielding arc surface at an angle of $\phi=90°$.

FIG. 5F illustrates a 2D shielding arc surface at an angle of $\phi=45°$.

FIG. 5G illustrates a 2D shielding arc surface at an angle of $\phi=30°$.

FIG. 6 is a flowchart of a lightning shielding failure risk assessment method for a power transmission line based on three-dimensional laser point cloud according to an embodiment of the present disclosure.

DETAILED DESCRIPTION

Figure 4:
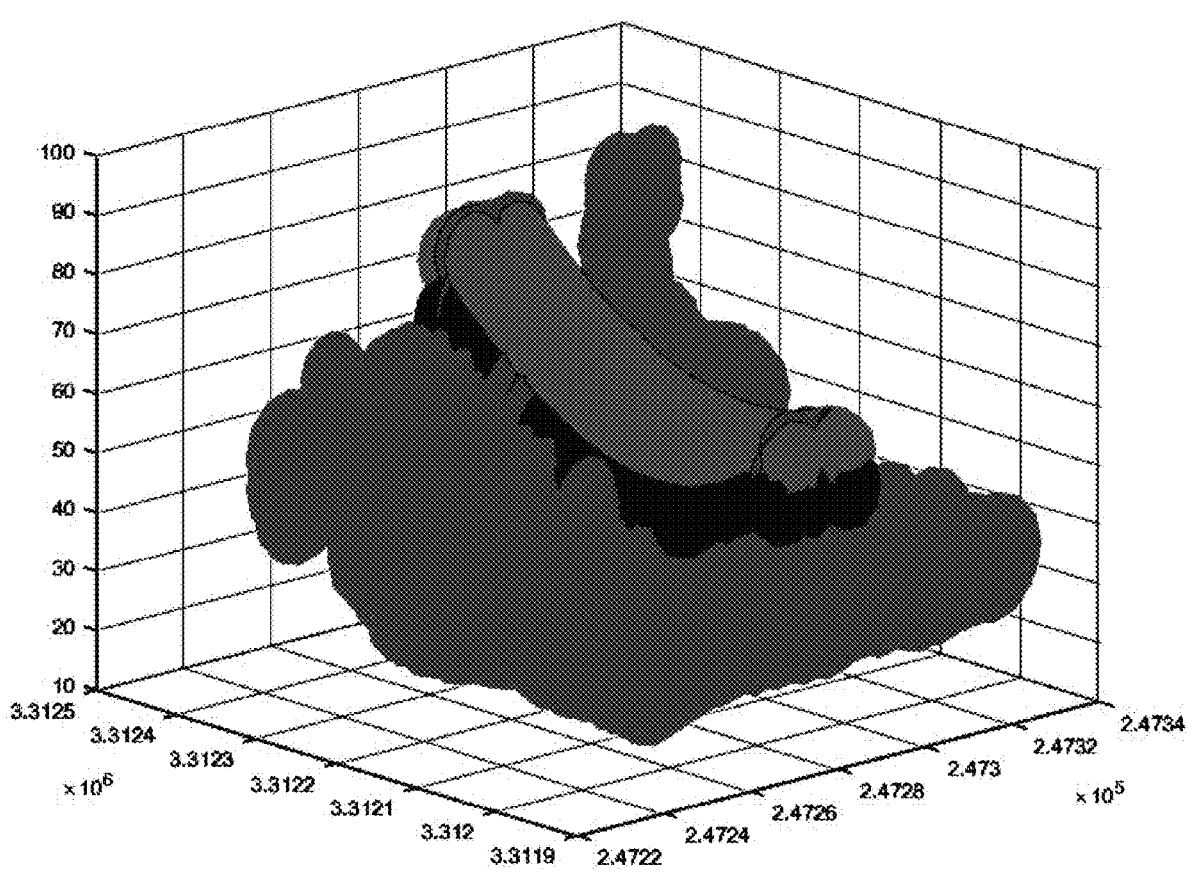
FIG. 4 illustrates a three-dimensional wire point cloud shielding arc surface, a three-dimensional ground wire point cloud shielding arc surface, and a three-dimensional ground point cloud shielding arc surface.

Referring to FIG. 6, a lightning shielding failure risk assessment method for a power transmission line based on three-dimensional laser point cloud data according to the present disclosure includes S1: reclassifying three-dimensional laser point cloud data of a power transmission corridor and preprocessing the three-dimensional laser point cloud data and a three-dimensional laser point coordinate system; S2: acquiring lightning activity parameters for the power transmission corridor, where the lightning activity parameters include a lightning strike density, a lightning current probability distribution function, and a lightning incidence angle probability distribution function; S3: determining a wire point cloud striking distance, a ground wire point cloud striking distance, and a ground point cloud striking distance based on a magnitude of a given lightning current amplitude; S4: plotting a three-dimensional wire point cloud shielding arc surface, a three-dimensional ground wire point cloud shielding arc surface, and a three-dimensional ground point cloud shielding arc surface in the preprocessed three-dimensional laser point coordinate system by using the reclassified and preprocessed three-dimensional laser point cloud data, the calculated wire point cloud striking distance, the calculated ground wire point cloud striking distance, and the calculated ground point cloud striking distance; S5: performing orthogonal projection of the plotted three-dimensional wire point cloud shielding arc surface, orthogonal projection of the plotted three-dimensional ground wire point cloud shielding arc surface, and orthogonal projection of the plotted three-dimensional ground point cloud shielding arc surface according to different lightning incidence angles to obtain two-dimensional wire point cloud exposed arc surfaces, two-dimensional ground wire point cloud exposed arc surfaces, and two-dimensional ground point cloud exposed arc surfaces respectively and determining the areas of the two-dimensional wire point cloud exposed arc surfaces, the area of the two-dimensional ground wire point cloud exposed arc surfaces, and the areas of the two-dimensional ground point cloud exposed arc surfaces; and S6: looping through S3 to S5 to calculate the area of the two-dimensional wire point cloud exposed arc surfaces, the areas of the two-dimensional ground wire point cloud exposed arc surfaces, and the area of the two-dimensional ground point cloud exposed arc surfaces at different lightning incidence angles and different lightning current amplitudes; and determining a line trip rate based on the lightning strike density, a lightning incidence angle probability distribution function, and the lightning current probability distribution function.

S1 includes S1.1 to S1.3.

In S1.1, the three-dimensional laser point cloud data is reclassified and colored.

According to the relevant standards of the State Grid Corporation, power transmission corridor laser point clouds are typically classified into more than 20 categories, including towers, wires, ground, vegetation, buildings, crossing. Among these, the categories related to lightning protection determination are wires, ground wires, and ground. The original laser point clouds are reclassified and colored based on the following rules.

TABLE 1

Colors for laser point cloud classification

| Point Cloud Classification for Lightning Protection Assessment | Original Point Cloud Classification | Color |
|---|---|---|
| wires | wires | red |
| ground wires | ground wires, crossed lines, other lines, shared lines | green |
| ground | ground, vegetation, transmission towers, buildings, temporary buildings, bridges, railways, railway catenaries and contact lines, roads, lakes and rivers, ships/cars, channel defects, simulated wires, others | blue |

The laser point cloud after reclassification and coloring is shown in FIG. 1. The point cloud coloring scheme may also be changed as desired, for example, either in color or in black and white. The corresponding pixel colors may be modified accordingly during the area determination in S5.

In S1.2, the three-dimensional laser point cloud is preprocessed.

The original laser point cloud has a high point density and contains a large number of noise points and outliers, thus affecting the speed and accuracy of plotting subsequent three-dimensional shielding arcs. Therefore, it is necessary to first perform point resampling and outlier removal on the original laser point cloud.

In S1.2.1, point cloud resampling is performed.

An equidistant resampling function from a library such as Open3D, CloudCompare, or point cloud library (PCL) is used to resample original point cloud, ensuring that a geometric distance between resampled points does not exceed a given value d. d should be much smaller than the striking distance. For shielding failure determination of a 220 kV line, d may range from 1 to 3 meters. Other resampling methods such as voxel resampling or random resampling may also be used as long as the point cloud density is reduced and the basic structure of the ground wire is complete.

In S1.2.2, outlier removal is removed.

Outliers are removed from point cloud samples by using a statistical outlier removal (SOR) filter. In an example, all neighboring points of each point in the point cloud data are traversed, and distances $d_{ij}$ from each point in the point cloud data to the neighboring points are calculated. Here $i=1, 2, \ldots, m, j=1, 2, \ldots, k$, m denotes the total number of points in the point cloud data, k denotes the number of neighboring points, and k ranges from 6 to 10. Neighborhood distance statistical parameters for a point cloud set are calculated:

$$\mu = \frac{1}{mk}\sum_{i=1}^{m}\sum_{j=1}^{k}d_{ij}$$

$$\sigma = \sqrt{\frac{1}{mk}\sum_{i=1}^{m}\sum_{j=1}^{k}(d_{ij}-\mu)^2}$$

Here $\mu$ denotes the mean value of neighborhood distances for the point cloud set, and $\sigma$ denotes the standard deviation of the neighborhood distances for the point cloud set.

For point i, if distances from the point i to neighboring points of the point i satisfying the following formula, the point i is considered as an outlier and removed:

$$\frac{1}{k}\sum_{j=1}^{k}d_{ij} > \mu + 3\sigma.$$

FIG. 2 illustrates point clouds after resampling and outlier removal. FIG. 2A illustrates a ground wire point cloud after resampling and outlier removal. FIG. 2B illustrates a ground point cloud after resampling and outlier removal. FIG. 2C illustrates a wire point cloud after resampling and outlier removal. FIG. 2D illustrates a combined point cloud composed of a ground wire point cloud, a ground point cloud, and a wire point cloud after resampling and outlier removal. To remove outliers, in addition to the statistical filter, other filters such as pass-through filters, voxel grid filters, Gaussian filters, and radius filters may also be used as long as they can effectively remove obvious outliers.

In S1.3, a resampled point cloud coordinate system is adjusted.

To facilitate subsequent operations such as point cloud rotation and projection transformation, the original 3D point cloud coordinate system needs to be adjusted. A connecting line that connects the center of a large-side tower and the center of a small-side tower is plotted, and the angle $\gamma$ between the connecting line and the Y-axis of the original coordinate system is acquired. FIG. 3A illustrates the original point cloud coordinate system. FIG. 3B illustrates a point cloud coordinate system after coordinate transformation. The original point cloud data is rotated around the Z-axis of the original coordinate system by the angle $\gamma$, that is, coordinates of the original point cloud data are multiplied by a coordinate transformation matrix $Tz(\gamma)$:

$$T_z(\gamma) = \begin{bmatrix} \cos(\gamma) & \sin(\gamma) & 0 \\ \sin(\gamma) & \cos(\gamma) & 0 \\ 0 & 0 & 1 \end{bmatrix}.$$

S2 includes S2.1, S2.2, S2.3, and S2.4.

In S2.1, lightning positioning system data is queried, and the total number of lightning strikes in the power transmission corridor within one year and a lightning current amplitude for each lightning strike are selected.

In S2.2: the lightning strike density Ng is determined based on an area of the power transmission corridor and the total number of lightning strikes, where the lightning strike density is in units of $km^2$.

In S2.3, for the selected lightning strikes, the lightning current amplitude I is statistically determined and fitted using a log-normal distribution based on the following formulas:

$$f(I) = \frac{1}{\sqrt{2\pi}\,\beta I} e^{-z^2/2}, \text{ and}$$

$$z = \frac{\ln I - \text{mean}(\ln I)}{\beta}.$$

Here lnI denotes a natural logarithm of the lightning current amplitude I, mean(lnI) denotes the mean value of the natural logarithm of the lightning current amplitude, and $\beta$ denotes the standard deviation of the natural logarithm of the lightning current amplitudes.

In S2.4, since the lightning leader is not vertical when approaching the ground, the incidence angle of the lightning leader needs to be considered. The lightning leader incidence angle distribution probability distribution function proposed by Brown and Whitehead is used:

$$g(\phi) = 0.75 \times \cos^3(\phi), \ -\pi/2 < \phi < \pi/2.$$

Here $\varphi$ denotes the angle between the lightning leader and the vertical direction.

S3 includes S3.1 and S3.2.

In S3.1, the wire point cloud striking distance $r_c$ and the ground wire point cloud striking distance $r_{gw}$ under a given lightning current amplitude I are determined by using the Eriksson-modified electro-geometric model: $r_c = r_{gw} = 0.67 \times h^{0.6} \times I^{0.74}$.

Here h denotes the height (that is, a Z-coordinate) of wire point cloud data or ground wire point cloud data, and I denotes the lightning current amplitude.

In S3.2, the ground point cloud striking distance $r_g$ is determined by using $r_g = 0.9 \times I^{0.65}$.

In S4, a three-dimensional wire point cloud shielding arc surface, a three-dimensional ground wire point cloud shielding arc surface, and a three-dimensional ground point cloud shielding arc surface are plotted according to the magnitude of the lightning current amplitude. As shown in FIG. 4, for any point cloud point $p_i(x_i, y_i, z_i)$, a three-dimensional shielding arc surface of the point cloud point is a spherical surface, and an equation for the spherical surface is $(x - x_i)^2 + (y - y_i)^2 + (z - z_i)^2 = r^2$.

Here r denotes a striking distance corresponding to a point cloud of the same type as the point cloud point; and three-dimensional shielding arc surfaces of different types of objects are obtained after unions of spherical surfaces plotted for different types of point clouds are calculated.

S5 includes S5.1, S5.2, and S5.3.

In S5.1, a plotted three-dimensional shielding arc surface is plotted counterclockwise by an angle $\varphi$ along the Y-axis, that is, each point on a three-dimensional shielding arc surface is multiplied by the following coordinate transformation matrix $T_y(\phi)$:

$$T_y(\varphi) = \begin{bmatrix} 1 & 0 & 0 \\ 0 & \cos(\varphi) & -\sin(\varphi) \\ 0 & \sin(\varphi) & \cos(\varphi) \end{bmatrix}.$$

In S5.2, orthogonal projection is performed along the Z-axis direction on the three-dimensional shielding arc surface to obtain a two-dimensional shielding arc surface. FIG. 5A illustrates a 2D shielding arc surface at an angle of $\varphi = -90°$. FIG. 5B illustrates a 2D shielding arc surface at an angle of $\varphi = -45°$. FIG. 5C illustrates a 2D shielding arc surface at an angle of $\varphi = -30°$. FIG. 5D illustrates a 2D shielding arc surface at an angle of $\varphi = 0°$. FIG. 5E illustrates a 2D shielding arc surface at an angle of $\varphi = 90°$. FIG. 5F illustrates a 2D shielding arc surface at an angle of $\varphi = 45°$. FIG. 5G illustrates a 2D shielding arc surface at an angle of $\varphi = 30°$. The scale factor of the orthogonal projection is M, that is, the actual area corresponding to each pixel of a projected two-dimensional image. Here the actual area is in units of $km^2/pixel$.

In S5.3, the areas of the shielding arc surfaces at different angles is determined.

The number of red pixels (exposed wire arc surfaces) in the figure is counted and multiplied by the projection scale factor M to obtain the areas of the exposed wire arc surfaces at different lightning incidence angles by the following formula. Here the areas of the exposed wire arc surfaces at different lightning incidence angles are in units of $km^2$:

$$S_c(I, \phi) = \text{count}(p \cdot \text{color} = \text{red}) \times M.$$

S6 includes looping to calculate the area of two-dimensional exposed arc surfaces at different lightning incidence angles and different lightning current amplitudes and determining the line shielding failure trip rate $R_{SFFOR}$ based on the lightning incidence angle probability distribution function and the lightning current probability distribution function by the following formula:

$$R_{SFFOR} = 2N_g \int_{-\pi/2}^{\pi/2} \int_{I_c}^{I_{max}} S_c(I, \phi) f(I) g(\phi) dI d\phi.$$

Here Ic denotes the minimum lightning current amplitude able to cause line tripping at a given lightning incidence angle φ, and Imax denotes the maximum lightning current amplitude able to cause line tripping at the given lightning incidence angle φ. Here the minimum lightning current amplitude and the maximum lightning current amplitude are in units of kA. Here Ic can be calculated based on insulator puncture breakdown test data, and Imax is the minimum lightning current amplitude that enables Sc(I, φ)=0.

The present disclosure addresses the shortcomings of traditional shielding failure risk assessment methods by proposing a lightning shielding failure risk assessment method for a power transmission line based on three-dimensional laser point cloud data. The lightning shielding failure risk assessment method for a power transmission line based on three-dimensional laser point cloud data abandons the traditional "slicing-parameter extraction" approach and, by integrating EGM with the three-dimensional laser point cloud, transforms the complex geometric relationship judgment of shielding arcs at different lightning incidence angles into three-dimensional orthogonal projections at different angles, thereby achieving fast and accurate lightning shielding failure risk assessment for transmission lines.

The striking distances for different types of objects are determined based on the magnitude of the lightning current. The three-dimensional wire, ground wire, and ground point cloud shielding arc surfaces are plotted in three-dimensional space by using the three-dimensional laser point cloud coordinates and striking distance parameters. At different lightning incidence angles, orthogonal projection of the three-dimensional shielding arc surfaces of various objects within the power transmission corridor is performed to obtain two-dimensional exposed arc surfaces. The area of the two-dimensional exposed arc surfaces is calculated. The area of the two-dimensional exposed arc surfaces is loop-calculated at different lightning incidence angles and different lightning current amplitudes. The line trip rate is calculated based on the lightning strike density, the lightning incidence angle probability distribution function, and the lightning current probability distribution function.

Compared with the traditional lightning shielding failure risk assessment method for power transmission lines based on digital elevation models or three-dimensional laser point clouds, without complex two-dimensional slicing, parameter extraction, and geometric relationship determination of shielding arcs, the present disclosure enables rapid determination of the area of the three-dimensional exposed arc surfaces of the power transmission line and accurate assessment of the line shielding failure trip rate.

The present disclosure is applicable to various line installation methods and can fully consider the impact of complex terrain and topography, crossing spans, and adjacent lines in dense corridors on lightning shielding characteristics. Compared with traditional methods, the present disclosure has the significant advantages of a broader scope of application, a higher assessment accuracy, a finer granularity, and simpler and faster computation.

What is claimed is:

1. A lightning shielding failure risk assessment method for a power transmission line based on three-dimensional laser point cloud, comprising:

S1: reclassifying three-dimensional laser point cloud data of a power transmission corridor and preprocessing the three-dimensional laser point cloud data and a three-dimensional laser point coordinate system;

S2: acquiring lightning activity parameters for the power transmission corridor, wherein the lightning activity parameters comprise a lightning strike density, a lightning current probability distribution function, and a lightning incidence angle probability distribution function;

S3: determining a wire point cloud striking distance, a ground wire point cloud striking distance, and a ground point cloud striking distance based on a magnitude of a given lightning current amplitude;

S4: plotting a three-dimensional wire point cloud shielding arc surface, a three-dimensional ground wire point cloud shielding arc surface, and a three-dimensional ground shielding arc surface in the preprocessed three-dimensional laser point coordinate system by using the reclassified and preprocessed three-dimensional laser point cloud data, the calculated wire point cloud striking distance, the calculated ground wire point cloud striking distance, and the calculated ground point cloud striking distance;

S5: performing orthogonal projection of the plotted three-dimensional wire point cloud shielding arc surface, orthogonal projection of the plotted three-dimensional ground wire point cloud shielding arc surface, and orthogonal projection of the plotted three-dimensional ground point cloud shielding arc surface according to different lightning incidence angles to obtain two-dimensional wire point cloud exposed arc surfaces, two-dimensional ground wire point cloud exposed arc surfaces, and two-dimensional ground point cloud exposed arc surfaces respectively and determining areas of the two-dimensional wire point cloud exposed arc surfaces, areas of the two-dimensional ground wire point cloud exposed arc surfaces, and areas of the two-dimensional ground point cloud exposed arc surfaces; and S6: looping through S3 to S5 to calculate the areas of the two-dimensional wire point cloud exposed arc surfaces, the areas of the two-dimensional ground wire point cloud exposed arc surfaces, and the areas of the two-dimensional ground point cloud exposed arc surfaces at different lightning incidence angles and different lightning current amplitudes, and determining a line trip rate based on the lightning strike density, the lightning incidence angle probability distribution function, and the lightning current probability distribution function;

wherein the step S5 comprises:

multiplying each point on a three-dimensional shielding arc surface by the following coordinate transformation matrix $T_y(\phi)$ $$T_y(\phi) = \begin{bmatrix} 1 & 0 & 0 \\ 0 & \cos(\phi) & -\sin(\phi) \\ 0 & \sin(\phi) & \cos(\phi) \end{bmatrix};$$

performing orthogonal projection along a Z-axis direction on the three-dimensional shielding arc surface rotated counterclockwise by an angle φalong a Y-axis to obtain a two-dimensional shielding arc surface, wherein a scale factor of the orthogonal projection is M; and counting a number of exposed wire arc surfaces and multiplying the number of exposed wire arc surfaces by the projection scale factor M to obtain areas of the exposed wire arc surfaces at different lightning incidence angles by the following formula, wherein the areas of the exposed wire arc surfaces at different lightning incidence angles are in units of $km^2$:

$S_c(I,\phi)=\text{count}(p.\text{color}=\text{red})\times M$ , wherein Sc denotes the areas of the exposed wire arc surfaces at different lightning incidence angles.

2. The lightning shielding failure risk assessment method for a power transmission line based on three-dimensional laser point cloud data according to claim 1, wherein reclassifying the three-dimensional laser point cloud data of the power transmission corridor and preprocessing the three-dimensional laser point cloud data and the three-dimensional laser point coordinate system comprises:

reclassifying and coloring the three-dimensional laser point cloud data;

preprocessing the reclassified and colored three-dimensional laser point cloud data:

resampling original point cloud data such that a geometric distance between resampled points does not exceed a given value d, wherein d is much smaller than a striking distance;

removing outliers from point cloud samples by using a statistical outlier removal (SOR) filter; and plotting a connecting line that connects a center of a large-side tower and a center of a small-side tower, acquiring an angle γ between the connecting line and a Y-axis of an original coordinate system, and multiplying coordinates of the original point cloud data by a coordinate transformation matrix Tz (γ):

$$T_z(\gamma) = \begin{bmatrix} \cos(\gamma) & \sin(\gamma) & 0 \\ \sin(\gamma) & \cos(\gamma) & 0 \\ 0 & 0 & 1 \end{bmatrix}.$$

3. The lightning shielding failure risk assessment method for a power transmission line based on three-dimensional laser point cloud data according to claim 2, wherein reclassifying the three-dimensional laser point cloud data of the power transmission corridor comprises:

reclassifying the laser point cloud data of the power transmission corridor into wire point cloud data, ground wire point cloud data, and ground point cloud data associated with lightning protection determination and coloring the wire point cloud data, the ground wire point cloud data, and the ground point cloud data;

wherein the wire point cloud data comprises original wire point cloud data, the ground wire point cloud data comprises original ground wire point cloud data, crossing wire point cloud data, other wire point cloud data, and shared wire point cloud data, and remaining original point cloud data is classified as the ground point cloud data.

4. The lightning shielding failure risk assessment method for a power transmission line based on three-dimensional laser point cloud data according to claim 2, wherein removing the outliers from the point cloud samples comprises:

traversing all neighboring points of each point in the point cloud data and determining distances dij from each point in the point cloud data to the neighboring points, wherein i=1, 2, . . . , m, j=1, 2, . . . , k, m denotes a total number of points in the point cloud data, k denotes a number of neighboring points, and k ranges from 6 to 10; and determining neighborhood distance statistical parameters for a point cloud set:

$$\mu = \frac{1}{mk}\sum_{i=1}^{m}\sum_{j=1}^{k}d_{ij},$$

-continued $$\sigma = \sqrt{\frac{1}{mk}\sum_{i=1}^{m}\sum_{j=1}^{k}(d_{ij}-\mu)^2},$$

wherein μ denotes a mean value of neighborhood distances for the point cloud set, and σ denotes a standard deviation of the neighborhood distances for the point cloud set; and for point i, in response to distances from the point i to neighboring points of the point i satisfying the following formula, determining the point i as an outlier and removing the point i:

$$\frac{1}{k}\sum_{j=1}^{k}d_{ij} > \mu + 3\sigma.$$

5. The lightning shielding failure risk assessment method for a power transmission line based on three-dimensional laser point cloud data according to claim 1, wherein acquiring the lightning activity parameters for the power transmission corridor comprises:

querying lightning positioning system data and selecting a total number of lightning strikes in the power transmission corridor within one year and a lightning current amplitude for each lightning strike;

determining the lightning strike density Ng based on an area of the power transmission corridor and the total number of lightning strikes, wherein the lightning strike density is in units of km²;

statistically determining the lightning current amplitude for each selected lightning strike by using a log-normal distribution based on the following formulas:

$$f(I) = \frac{1}{\sqrt{2\pi}\beta I}e^{-z^2/2},$$

$$z = \frac{\ln I - \text{mean}(\ln I)}{\beta},$$

wherein f(I) denotes a lightning current probability distribution function, lnI denotes a natural logarithm of the lightning current amplitude I, mean (lnI) denotes a mean value of natural logarithms of lightning current amplitudes, and β denotes a standard deviation of the natural logarithms of the lightning current amplitudes; and defining the lightning incidence angle probability density function as the following formula:

$$g(\phi) = 0.75 \times \cos^3(\phi), -\pi/2 < \phi < \pi/2,$$

wherein φ denotes an angle between a lightning leader and a vertical direction.

6. The lightning shielding failure risk assessment method for a power transmission line based on three-dimensional laser point cloud data according to claim 2, wherein acquiring the lightning activity parameters for the power transmission corridor comprises:

querying lightning positioning system data and selecting a total number of lightning strikes in the power transmission corridor within one year and a lightning current amplitude for each lightning strike;

determining the lightning strike density Ng based on an area of the power transmission corridor and the total number of lightning strikes, wherein the lightning strike density is in units of km²;

statistically determining the lightning current amplitude for each selected lightning strike by using a log-normal distribution based on the following formulas:

$$f(I) = \frac{1}{\sqrt{2\pi}\,\beta I} e^{-z^2/2},$$

$$z = \frac{\ln I - \mathrm{mean}(\ln I)}{\beta},$$

wherein f(I) denotes a lightning current probability distribution function, lnI denotes a natural logarithm of the lightning current amplitude I, mean (lnI) denotes a mean value of natural logarithms of lightning current amplitudes, and β denotes a standard deviation of the natural logarithms of the lightning current amplitudes; and defining the lightning incidence angle probability density function as the following formula:

$$g(\phi) = 0.75 \times \cos^3(\phi),\ -\pi/2 < \phi < \pi/2,$$

wherein φ denotes an angle between a lightning leader and a vertical direction.

7. The lightning shielding failure risk assessment method for a power transmission line based on three-dimensional laser point cloud data according to claim 3, wherein acquiring the lightning activity parameters for the power transmission corridor comprises:

querying lightning positioning system data and selecting a total number of lightning strikes in the power transmission corridor within one year and a lightning current amplitude for each lightning strike;

determining the lightning strike density Ng based on an area of the power transmission corridor and the total number of lightning strikes, wherein the lightning strike density is in units of km²;

statistically determining the lightning current amplitude for each selected lightning strike by using a log-normal distribution based on the following formulas:

$$f(I) = \frac{1}{\sqrt{2\pi}\,\beta I} e^{-z^2/2},$$

$$z = \frac{\ln I - \mathrm{mean}(\ln I)}{\beta},$$

wherein f(I) denotes a lightning current probability distribution function, lnI denotes a natural logarithm of the lightning current amplitude I, mean (lnI) denotes a mean value of natural logarithms of lightning current amplitudes, and β denotes a standard deviation of the natural logarithms of the lightning current amplitudes; and defining the lightning incidence angle probability density function as the following formula:

$$g(\phi) = 0.75 \times \cos^3(\phi),\ -\pi/2 < \phi < \pi/2,$$

wherein φ denotes an angle between a lightning leader and a vertical direction.

8. The lightning shielding failure risk assessment method for a power transmission line based on three-dimensional laser point cloud data according to claim 4, wherein acquiring the lightning activity parameters for the power transmission corridor comprises:

querying lightning positioning system data and selecting a total number of lightning strikes in the power transmission corridor within one year and a lightning current amplitude for each lightning strike;

determining the lightning strike density Ng based on an area of the power transmission corridor and the total number of lightning strikes, wherein the lightning strike density is in units of km²;

statistically determining the lightning current amplitude for each selected lightning strike by using a log-normal distribution based on the following formulas:

$$f(I) = \frac{1}{\sqrt{2\pi}\,\beta I} e^{-z^2/2},$$

$$z = \frac{\ln I - \mathrm{mean}(\ln I)}{\beta},$$

wherein f(I) denotes a lightning current probability distribution function, lnI denotes a natural logarithm of the lightning current amplitude I, mean (lnI) denotes a mean value of natural logarithms of lightning current amplitudes, and β denotes a standard deviation of the natural logarithms of the lightning current amplitudes; and defining the lightning incidence angle probability density function as the following formula:

$$g(\phi) = 0.75 \times \cos^3(\phi),\ -\pi/2 < \phi < \pi/2,$$

wherein φ denotes an angle between a lightning leader and a vertical direction.

9. The lightning shielding failure risk assessment method for a power transmission line based on three-dimensional laser point cloud data according to claim 5, wherein the wire point cloud striking distance $r_c$ and the ground wire point cloud striking distance $r_{gw}$ are determined by the following formula:

$$r_c = r_{gw} = 0.67 \times h^{0.6} I^{0.74},$$

wherein h denotes a height of wire point cloud data or ground wire point cloud data, and I denotes the lightning current amplitude; and the ground point cloud striking distance $r_g$ is determined by the following formula:

$$r_g = 0.9 \times I^{0.65}.$$

17

10. The lightning shielding failure risk assessment method for a power transmission line based on three-dimensional laser point cloud data according to claim 1, wherein for any point cloud point $p_i(x_i, y_i, z_i)$, a three-dimensional shielding arc surface of the point cloud point is a spherical surface, and an equation for the spherical surface is:

$$(x - x_i)^2 + (y - y_i)^2 + (z - z_i)^2 = r^2,$$

wherein r denotes a striking distance corresponding to a point cloud of the same type as the point cloud point; and three-dimensional shielding arc surfaces of different types of objects are obtained after unions of spherical surfaces plotted for different types of point clouds are calculated.

11. The lightning shielding failure risk assessment method for a power transmission line based on three-dimensional laser point cloud data according to claim 2, wherein for any point cloud point $p_i(x_i, y_i, z_i)$, a three-dimensional shielding arc surface of the point cloud point is a spherical surface, and an equation for the spherical surface is:

$$(x - x_i)^2 + (y - y_i)^2 + (z - z_i)^2 = r^2,$$

wherein r denotes a striking distance corresponding to a point cloud of the same type as the point cloud point; and three-dimensional shielding arc surfaces of different types of objects are obtained after unions of spherical surfaces plotted for different types of point clouds are calculated.

12. The lightning shielding failure risk assessment method for a power transmission line based on three-dimensional laser point cloud data according to claim 3, wherein for any point cloud point $p_i(x_i, y_i, z_i)$, a three-dimensional shielding arc surface of the point cloud point is a spherical surface, and an equation for the spherical surface is:

18

$$(x - x_i)^2 + (y - y_i)^2 + (z - z_i)^2 = r^2,$$

wherein r denotes a striking distance corresponding to a point cloud of the same type as the point cloud point; and three-dimensional shielding arc surfaces of different types of objects are obtained after unions of spherical surfaces plotted for different types of point clouds are calculated.

13. The lightning shielding failure risk assessment method for a power transmission line based on three-dimensional laser point cloud data according to claim 4, wherein for any point cloud point $p_i(x_i, y_i, z_i)$, a three-dimensional shielding arc surface of the point cloud point is a spherical surface, and an equation for the spherical surface is:

$$(x - x_i)^2 + (y - y_i)^2 + (z - z_i)^2 = r^2,$$

wherein r denotes a striking distance corresponding to a point cloud of the same type as the point cloud point; and three-dimensional shielding arc surfaces of different types of objects are obtained after unions of spherical surfaces plotted for different types of point clouds are calculated.

14. The lightning shielding failure risk assessment method for a power transmission line based on three-dimensional laser point cloud data according to claim 9, wherein for any point cloud point $p_i(x_i, y_i, z_i)$, a three-dimensional shielding arc surface of the point cloud point is a spherical surface, and an equation for the spherical surface is:

$$(x - x_i)^2 + (y - y_i)^2 + (z - z_i)^2 = r^2,$$

wherein r denotes a striking distance corresponding to a point cloud of the same type as the point cloud point; and three-dimensional shielding arc surfaces of different types of objects are obtained after unions of spherical surfaces plotted for different types of point clouds are calculated.

* * * * *